United States Patent Office.

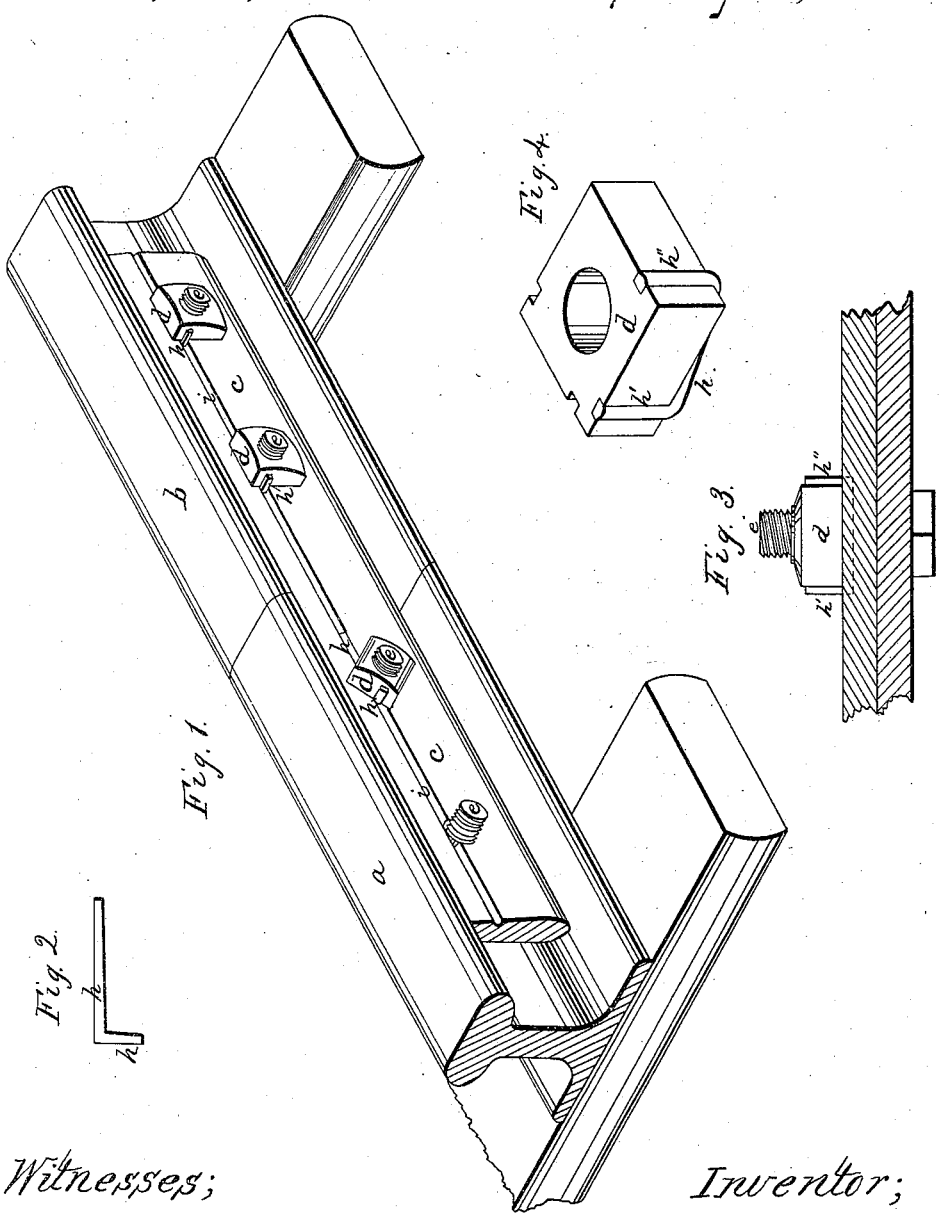

WILLIAM MULLINS, OF PITTSBURG, PENNSYLVANIA.

*Letters Patent No. 76,500, dated April 7, 1868.*

IMPROVED MODE OF LOCKING NUTS.

*The Schedule referred to in these Letters Patent and making part of the same.*

TO ALL WHOM IT MAY CONCERN:

Be it known that I, WILLIAM MULLINS, of the city of Pittsburg, in the county of Allegheny, and State of Pennsylvania, have invented a new and useful Improvement in the Mode of Locking Nuts; and I do hereby declare the following to be a full, clear, and exact description thereof.

My improved device for locking nuts, or preventing them from turning on the bolt on which they are screwed, consists of a pin of wrought iron or other suitable material inserted under the nut, near to the bolt, in a groove or slot made in the surface against which the nut is screwed, such pin being made L-shaped, or with a rectangular head, and the other end being turned up so as to embrace the nut.

To enable others skilled in the art to use my invention, I will proceed to describe it, by referring to the accompanying drawing, in which—

Figure 1 is a perspective representation of my improvement as applied to the locking of nuts used to fasten the ends of rails by means of a fish-bar.

Figure 2 represents the pin used for fastening the nuts.

Figure 3 is a side view of a nut-bolt, showing the manner in which the pin holds the nut.

Figure 4 is a perspective representation of a nut recessed to receive the locking-pin.

In the several figures like letters refer to similar parts.

In the drawing, fig. 1, $a$ and $b$ are rails, connected by means of fish-bars, $c$, placed in the usual way, on each side of the web of the rails, and secured by means of screw-bolts $e$ $e$, on which are screwed the nuts $d$ $d$. The nuts $d$ $d$ are screwed down to the face of the fish-bar $c$ without the interposition of a washer, although a washer may be used, if desired, as hereinafter explained.

In the face of the fish-bar is cut a groove, $i$, deep enough to receive the metallic pins $h$, so that the outer side of the pin, when in the groove, will be flush with the surface of the fish-bar. This groove $i$ is cut above the hole through which the bolt $e$ is to pass, so as not to interfere with it.

When the nut $d$ is screwed on the bolt $e$, down to the fish-bar, a wrought-iron pin, $h$, of the shape shown in fig. 2, having one end turned up so as to make a rectangular head, like a tenter-hook, is driven into the groove $i$, under the nut, until the head $h'$ rests against one side of the nut $d$, the shank of the pin being long enough to extend beyond the nut, on the opposite side, so that the shank may be turned up at right angles to the fish-bar $c$, close against the side of the nut, as shown in fig. 3, and the head $h'$ and turned-up end $h''$, of the pin may embrace the nut. In this relative position of the nut and pin, it is impossible for the nut to turn on the bolt, as it cannot do so without removing the pin from its groove, $i$, in which it is firmly held by the nut itself.

If it be desired to make use of a washer under the nut, it may be done by making the washer circular, and of diameter no greater than the width of the nut, so as to allow the pin to be turned up against the sides of the nut, the washer, as well as the nut, being placed over the pin.

The pin may be made of the shape shown in fig. 2, with one end ready turned up or headed, or a straight pin may be inserted in the groove and afterwards turned up at both ends against the sides of the nut.

As shown in fig. 1, the nut may be locked either with two sides at right angles to the groove $i$, or in a diagonal position, all that is requisite being that the nut should hold the pin down in the groove, and that the pin should so embrace the nut as to prevent its turning.

If desired, in order to improve the finish and appearance of the work, a slot, $s$, (see fig. 4,) may be made in the sides of the nut, to receive the turned-up end or ends of the pin, the extremity of the pin being dressed down even with the top of the nut.

My improved mode of locking nuts is applicable to almost all circumstances in which nuts are employed, and to all descriptions of machinery and structure in which they can be used, the only condition which is necessary being that there should be a solid material under the nut, and against which it is to be screwed, in which to make the groove to receive the locking-pin.

My improvement commends itself by its great simplicity, and the ease with which it may be applied, requiring, as it does, nothing but a metallic pin in addition to the ordinary bolt and nut, and the cutting of a groove to receive the rim.

Having thus described my improvement, what I claim as my invention, and desire to secure by Letters Patent, is—

The improved device for locking nuts, consisting of a metallic pin placed under the nut, in a groove in the surface, against which the nut is screwed, and turned up so as to embrace the nut, substantially as hereinbefore described.

In testimony whereof, I, the said WILLIAM MULLINS, have hereunto set my hand.

W. MULLINS.

Witnesses:
   W. BAKEWELL,
   A. S. NICHOLSON.